Figure 1:
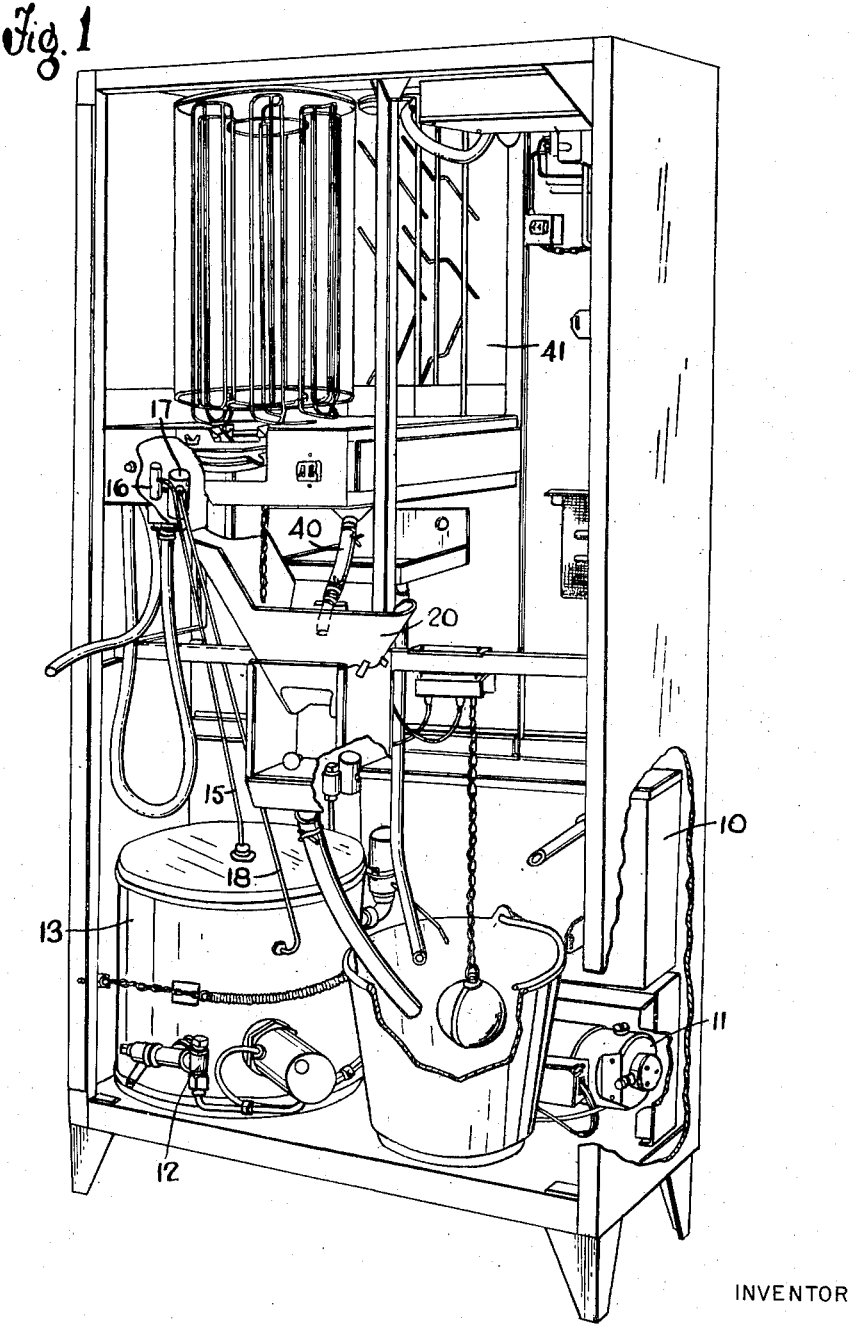

Aug. 17, 1965  S. A. MAXWELL  3,200,992
HOT BEVERAGE DISPENSING MACHINES
Filed July 2, 1962  2 Sheets-Sheet 1

INVENTOR
STEWART ALFRED MAXWELL

BY
ATTORNEY

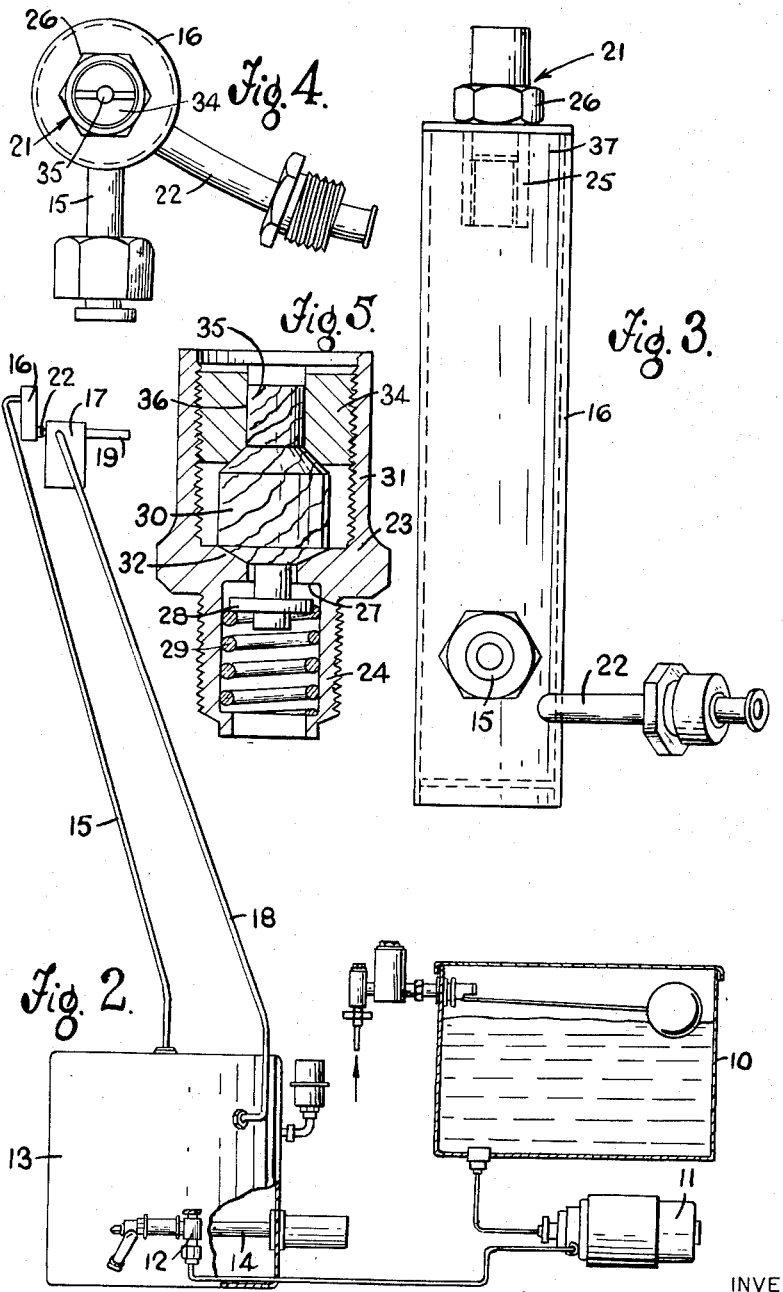

3,200,992
HOT BEVERAGE DISPENSING MACHINES

Stewart A. Maxwell, Walsall, England, assignor to Fisher & Ludlow Limited, Birmingham, England, a British company
Filed July 2, 1962, Ser. No. 206,610
1 Claim. (Cl. 222—52)

This invention relates to hot beverage dispensing machines of the kind (hereinafter referred to as the kind specified) which include a water storage vessel, a heater associated with said vessel, and a water circulating system round which the heated water will circulate constantly so that, even if the machine has been standing idle for some time, the water in the pipe supplying the mixing or dispensing station will always be hot as will the parts of the machine associated with such station.

The object of the present invention is to provide an improved construction of hot beverage dispensing machines of the kind specified.

The invention will now be particularly described by way of example with reference to the accompanying drawings in which:

FIGURE 1 is a perspective view of a coffee dispensing machine with the front removed and with parts broken away, FIGURE 2 is a schematic diagram of the water system, FIGURES 3 and 4 are mutually perpendicular views of a collecting chamber fitted with an air bleed valve, and FIGURE 5 is an enlarged axial section through the air bleed valve.

As shown in FIGURE 1 the machine is of generally rectangular form and is adapted to stand upon the floor or similar supporting surface with its major axis vertical. The front of the machine (not shown) would be hinged along the left hand side with respect to FIGURE 1 so that access may be had to the inside of the machine and the main portion of the machine carries in the bottom part thereof a water storage tank 10 which is supplied by the mains and from which cold water is fed by a pump 11 through a non-return valve 12 to a hot water tank 13 which is fitted with a suitable thermostatically controlled immersion heater 14.

The pump 11 which is only operative during a vend or operative cycle of the machine, serves to pressurise the hot water tank 13 and also to ensure that a predetermined quantity of water is delivered to the dispensing station on each operation of the machine regardless of any variations which may have occurred in the mains supply pressure. The supply to the hot water tank is connected adjacent the bottom thereof, whilst an outlet pipe 15 from the hot water tank is at the top thereof. The hot water passes through this pipe 15 and through a collecting chamber 16 and a water supply valve 17, as will presently be described, and thence through a return pipe 18 which is connected to the hot water tank approximately one quarter of the way down the side thereof. Thus a complete hot water circulation path is provided so that under the thermal forces present hot water circulates continuously regardless of whether or not the machine is operative.

The water supply valve 17 is a two-way valve which normally passes the water from the collecting chamber to the return pipe 18 of the circulating path but which, when the machine is operated, directs the water to an outlet pipe 19 which discharges into a mixing vessel 20 to which coffee, sugar and milk will also be passed through pipe 40 from ingredient containers 41.

This two-way valve 17 is operated by a suitable cam controlled relay and will be held in its operative position, that is to say, with the water passing to the outlet pipe 19, for a predetermined time in order to provide the necessary quantity of water for dispensing a full cup.

If desired the two way valve 17 may be so arranged that when the valve is operative the port associated with the return pipe is closed thereby preventing water which is in the return pipe from being drawn out of the valve.

With such an arrangement there is danger of air locks developing in the system due to the inevitable presence of air in the water and in order to eliminate the failure of the machine due to an air lock we provide, in the water circulating system, an air bleed valve 21. This valve is mounted in the top of the cylindrical collecting chamber 16 to which the pipe 15 is connected at a higher level than the connecting pipe 22 leading to the two-way valve 17 so that any air bubbles in the water entering the connecting chamber 16 rise and are not passed to the two-way valve 17.

The air bleed valve 21 includes a hollow housing 23 which is externally screw threaded along its lower portion 24 for engagement within a correspondingly threaded sleeve 25 depending downwardly from the top of the connecting chamber 16. The central portion 26 of the housing is hexagonal so that it can be engaged by a spanner to secure the valve firmly in position in the sleeve. The interior of the lower portion 24 is cylindrical and its upper end is provided with a shoulder 27 forming a seat for a valve member 28. A compression spring 29 urges the valve member 28 towards the seat 27, but the valve member is normally held off its seat by a porous wooden plug 30 disposed in the upper portion 31 of the housing. The plug 30 has a tapered base 32 which is urged into engagement with a correspondingly tapered seat on the housing by a threaded collar 34 screwed into the interior of the upper portion 31. The plug has an upwardly projecting stem 35 which is a close fit within a bore 36 in the collar 34. The operation of the valve is as follows. If a substantial volume of air has collected at the top of the collecting chamber 16 the water level in this chamber will be below the bottom of the sleeve 25 and air can seep through the porous plug 30 and escape to atmosphere. As this air escapes so the water level will gradually rise until a condition is reached where the water level reaches the bottom of the plug 30, which, as it becomes wet, will tend to swell. Since the stem 35 is a tight fit within the bore 36 is can therefore only swell inwardly resulting in the closing of the pores of the stem so that the water does not escape therethrough. If more air enters the collecting chamber 16 the water level will fall and, as the plug 30 dries out, so the air will once more seep through the plug.

If it is necessary to replace the plug 30 by a new one, the old plug can be removed after unscrewing the collar 34. The compression spring 29 then urges the valve member 28 on to its seat so that no water is lost in the absence of the plug.

The sleeve 25 in which the valve housing 23 is mounted is of lesser diameter than the collecting chamber 16 so that there is an annular space 37 between the sleeve and the wall of the collecting chamber in which air will remain permanently trapped even where the water level has risen to the bottom of the plug 30. This annular cushion of air acts as a cushion against water hammer since the air will absorb the shock which is normally the cause of water hammer.

During the operation of the machine the pressure inside the hot water tank 13 will vary due to the cycling of the thermostat which controls the immersion heater 14 and also due to pressure and losses at the valve seatings and this variation in pressure will affect the water level in the collecting chamber 16 of the air bleed valve assembly. The water level will be lowest during periods of low pressure and the air will therefore be bled off during these low pressure periods.

What I claim then is:

In a hot beverage dispensing machine having water supply means, a container for water, means for maintaining the water in the container at a predetermined temperature, a beverage discharge, a mixing chamber ahead of the beverage discharge, a line extending from the container and returning to the container, and a discharge valve in said line, that improvement which comprises a combination water and air collector in the upper portion of said line having an air passage to the atmosphere and an upright valve chamber in the upper portion of said collector and out of the direct line of flow of the water passing through said collector, a hygroscopic valve body in said upright valve chamber having a portion snugly received in said valve chamber and extending downwardly into said collector, said valve body being so constructed and arranged that it will open when the water level is out of contact with said downwardly extending portion and the valve body has had a chance to dry sufficiently to allow air to pass.

References Cited by the Examiner

UNITED STATES PATENTS

| | | | |
|---|---|---|---|
| 1,078,420 | 11/15 | Davies | 137—329.4 |
| 1,237,144 | 8/17 | Allen | 137—171 X |
| 1,292,898 | 1/19 | Slater | 222—397 |
| 1,860,136 | 5/32 | Bunch | 222—396 |
| 2,088,073 | 7/37 | Voight | 137—202 X |
| 2,314,963 | 3/43 | Zelvis | 137—197 |
| 2,626,785 | 1/53 | Lewis et al. | 222—146 |
| 2,931,376 | 4/60 | Hendel | 137—197 |
| 2,996,222 | 8/61 | Botkin | 222—67 |
| 3,007,609 | 11/61 | Pascucci | 222—146 X |
| 3,039,661 | 6/62 | Wentz et al. | 222—396 |

RAPHAEL M. LUPO, *Primary Examiner.*

ISADOR WEIL, *Examiner.*